US005959288A

United States Patent [19]

Tajiri et al.

[11] Patent Number: 5,959,288

[45] Date of Patent: Sep. 28, 1999

[54] APPARATUS FOR SORTING VARIOUS KINDS OF SHEETS OF PAPER

[75] Inventors: Toshihiko Tajiri; Itsunori Utsumi, both of Owariasahi, Japan; Hanno Gillmann, Constance, Germany; Dietman Oexle, Singen, Germany; Armin Zimmermann, Constance, Germany

[73] Assignees: Hitachi, Ltd., Tokyo, Japan; EHG Electroholding GmbH, Frankfurt/Main, Germany

[21] Appl. No.: 08/814,355

[22] Filed: Mar. 11, 1997

[30] Foreign Application Priority Data

Mar. 12, 1996 [JP] Japan .................................... 8-054427

[51] Int. Cl.$^{6}$ .................................................... G06K 13/00

[52] U.S. Cl. ............................................. 235/475; 209/3.3

[58] Field of Search .............................. 235/462.01, 475, 235/477, 478, 480, 481, 483, 485; 209/3.3, 583, 584, 702, 705, 900, 942; 271/10.02, 10.03

[56] References Cited

U.S. PATENT DOCUMENTS

| | | | |
|---|---|---|---|
| 4,196,846 | 4/1980 | Kao et al. | 235/475 |
| 4,641,753 | 2/1987 | Tamada | 209/584 |
| 4,778,062 | 10/1988 | Pavie et al. | 209/900 |
| 4,998,626 | 3/1991 | Ota | 209/900 |
| 5,115,918 | 5/1992 | DeWitt et al. | 209/545 |
| 5,363,971 | 11/1994 | Weeks et al. | 209/584 |
| 5,433,325 | 7/1995 | Levaro et al. | 209/584 |
| 5,607,063 | 3/1997 | Nishijima et al. | 209/584 |
| 5,651,445 | 7/1997 | Stevens et al. | 271/9.11 |
| 5,697,504 | 12/1997 | Hiramatsu et al. | 209/900 |
| 5,749,473 | 5/1998 | Yamashita et al. | 209/584 |

FOREIGN PATENT DOCUMENTS

| | | |
|---|---|---|
| 0148487A2 | 7/1985 | European Pat. Off. . |
| 0661106A2 | 7/1995 | European Pat. Off. . |

OTHER PUBLICATIONS

Raes et al, "Optical Document Sorter ODS–1", Electrical Communication, vol. 45, No. 2, Jun. 1970, pp. 135–143.

*Primary Examiner*—Donald Hajec
*Assistant Examiner*—Diane I. Lee
*Attorney, Agent, or Firm*—Fay, Sharpe, Beall, Fagan, Minnich & McKee

[57] ABSTRACT

An apparatus for sorting sheets includes a sorting section having boxes, a separating section, and a printing section, the latter two of which are respectively located on both sides of the sorting section. The separating section includes a separating mechanism for downwardly feeding out sheets in a constant gap system, a recognizing mechanism for scanning character information described on each sheet, a bar code scanning unit for scanning bar code information, and a conveying path of the separating section for conveying the sheets fed out of the separating mechanism. The printing section includes a printing mechanism for printing the recognized result as bar code information on the sheets, a verifying mechanism for verifying the printed result, and a conveying path of the printing section for feeding out the sheet on which the bar code is printed, to the sorting section. In an upper space of the sorting section is located a delaying conveying path for connecting the conveying path of the separating section with the conveying path of the printing section and securing the recognizing time.

18 Claims, 8 Drawing Sheets

APPARATUS FOR SORTING VARIOUS KINDS OF SHEETS OF PAPER

BACKGROUND OF THE INVENTION

The present invention relates to technology about sorting various kinds of sheets of paper, and more particularly to the technology which may be effectively applied to the sorting of various kinds of sheets of paper such as postcards and cards used in an information processing field.

For example, in the process of sorting a massive amount of postcards, the operation is executed to recognize character information containing a zip code and an address described on each postcard through the effect of the known OCR technology and activate a distributing mechanism in concert with the recognizing operation for automatically distributing the postcards to the corresponding destination areas. This operation makes it possible to achieve a saving in labor and speed up the work.

A conventional construction for executing the aforementioned operation is illustrated in FIG. 12. FIGS. 10A and 10B illustrate an exemplary system for conveying various kinds of sheets of paper 10 (simply called sheets). The sheets 10 are separated one by one by a separating mechanism 1011 located in a separating section 1001 so that each sheet is transferred to a conveying path. A numeral 1012 denotes a recognizing mechanism, which reads, for example, an address described in each sheet and then recognizes the read address through a desired algorithm stored in a computer. The time consumed by the recognition depends on the conveying path on which the sheets are conveyed. For apparatus' convenience' sake, this conveying path is located in a space 5 secured under the lowest row of boxes 1041 of a sorting section 1044. While the postcard is being conveyed on the conveying path, the characters of the address, for example, are recognized. Then, the postcard is sorted into the corresponding box 1041 through the effect of the sorting section 1044. However, if the characters are not recognized between the recognizing mechanism 1012 and the sorting section 1044, the postcard must be rejected. The frequent rejections become an obstacle to enhancing the operativity of the sorting apparatus. Hence, the improvement of the recognition factor is important in enhancing the operativity of the sorting apparatus. For quickly recognizing various kinds of characters, there must be provided an expensive computer for achieving the fast processing.

If the recognition is disabled, in recent days, a video coding system has been reviewed, in which the picture data scanned in recognizing the characters is displayed on a CRT so that an operator can read the unrecognized characters and manually enter the read characters to the apparatus. This video coding system does to need an expensive computer for recognizing the characters but needs a considerable length of time in the operator's recognition and input of the character information. Hence, this considerable length of time requires a long conveying path. The long conveying path, however, burdens the apparatus with a technical issue. That is, it needs an additional path to the outside of the apparatus, so that the path makes the apparatus larger in size. The resulting longer apparatus is not allowed to be stored a limited area, thereby making the installing area of the apparatus wider.

On the other hand, turning to an interval between the sheets 10 being separated by the separating section 1001 and conveyed on the conveying path, as illustrated in FIGS. 10A and 10B, the system currently employed about this point may be roughly divided into two systems, that is, a constant pitch system (see FIG. 10A) and a constant gap system (see FIG. 10B). The constant pitch system is arranged to keep the distance (pitch P) between the tail end of the leading sheet 10 and the tail end of the succeeding sheet 10 constant. The constant gap system is arranged to keep the distance (gap G) between the tail end of the leading sheet 10 and the front end of the succeeding sheet 10.

As illustrated in FIG. 12, as a main technical current, the separating mechanism 1011 located in the conventional separating section 1001 is constructed to separate the sheets 10 horizontally arranged in a standing manner toward the upward part from the ranging end. The constant pitch system is advantageous in this construction. This is because since the feeding lengths of the sheets 10 are varied, if the constant pitch system is employed, the upwardly separating system may be implemented by such a simple control operation as sending the tail end of the leading sheet 10 and then feeding out the succeeding sheet 10 after a predetermined time defined by the feeding speed and the pitch.

As described above, in a case that an expensive computer is not necessary if an operator's manual operation to be put to the overall process can compensate for a lower recognition factor to some extent, it is necessary to secure a sufficiently long conveying path without making the overall length of the apparatus longer. A bypass located in a narrower space entails a smaller curvature. The bypass with a small curvature puts a burden on the sheets, so that the sheets may be impaired and often jammed. In order to overcome these shortcomings, it is preferable to provide such a technique as allowing a relatively long conveying path to be located in a limited space without impairing the sheets being conveyed.

For the foregoing constant pitch system adapted to the upwardly separating system, since the sheets 1 have their respective lengths (heights), between the tail end of each leading sheet 10 and the front end of the succeeding sheet 10, the times passed therebetween is made variable. The box 1041 located in the sorting section 1044 has a gate 1042 for opening or shutting the gate. By controlling the timing when the sheet 10 comes to the gate 1042 and the timing when the gate 1042 is opened or shut, it is determined whether or not the passing sheet 10 is put in each box 1041. A short pitch may cause an erroneous operation or jamming. In order to avoid this disadvantage, the pitch is considered to be far larger than each length of the variable sheets 10. If, however, the pitch is larger than necessary, the number of the sheets 10 to be processed at a unit time, that is, a throughput is made lower. On the other hand, if the constant gap system is used, that is, the upwardly separating system, it may present another technical problem. That is, one alternative has to be, selected, a lower throughput required in the case of considering the variable lengths (heights) or a wider pitch P required in the case of speeding up the conveying speed.

SUMMARY OF THE INVENTION

It is an object of the present invention to provide technology of sorting sheets which makes it possible to increase the delaying conveying path without having to increase the apparatus's dimensions.

It is a further object of the present invention to provide technology of sorting sheets which makes it possible to increase the delaying conveying path without having to impair the sheets being conveyed.

It is a still further object of the present invention to provide technology of sorting sheets which makes the delaying conveying path long enough to secure a time for video recording without having to increase the apparatus' dimensions.

It is another object of the present invention to provide technology of sorting sheets which makes it possible to keep, and improve a throughput by adopting a constant gap system for conveyance of sheets with no relation to various length of the sheets.

According to an aspect of the present invention, an apparatus for sorting sheets includes a separating section for separating sheets one by one, a recognizing section for scanning a picture of text data described on each separated sheet, a computer for performing a recognition process for converting the scanned picture into text codes, a delaying conveying path for conveying the sheet by a time required for at least the recognition done by the computer, a printing section for converting the recognized text code data into bar code information and printing it on part of the sheet, a sorting section for sorting sheets on which the bar codes are printed into the corresponding ones of boxes arranged in a matrix manner, and wherein the separating section provides a separating mechanism for downwardly separating the sheets one by one.

Further, the delaying conveying path is located in at least one of an upper and a lower part of the sorting section.

The delaying conveying path located in at least one of the upper and the lower parts of the sorting section includes a bypass conveying path with plural turns.

The turning position of the bypass conveying path located in the lower part of the sorting section is located so that the turning position does not interfere with the inlet conveying path led from the printing section to the sorting section.

DESCRIPTION OF THE PREFERRED EMBODIMENTS

Hereafter, the detailed description will be oriented to the embodiments of the present invention with reference to the appended drawings.

Figure 1:
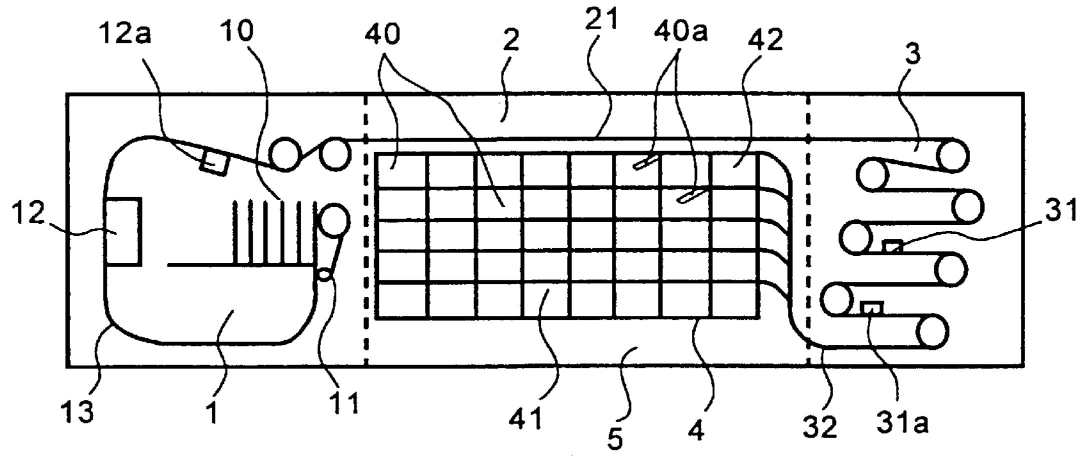
FIG. 1 is a view showing a construction of an apparatus for sorting sheets according to a first embodiment of the present invention.
Figure 8:
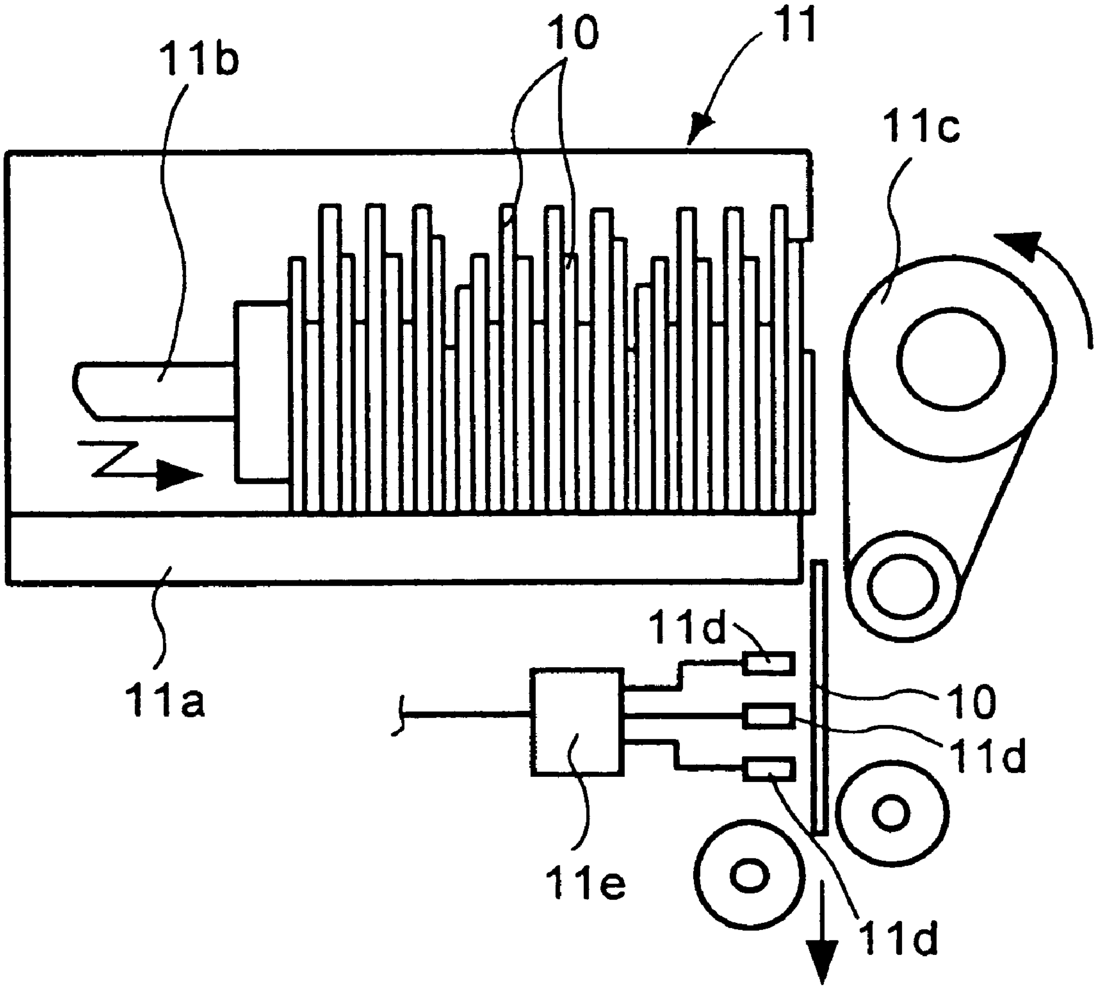
FIG. 8 is a side view showing a detailed construction of a separating section 1 located in the apparatus for sorting sheets.
Figure 11:
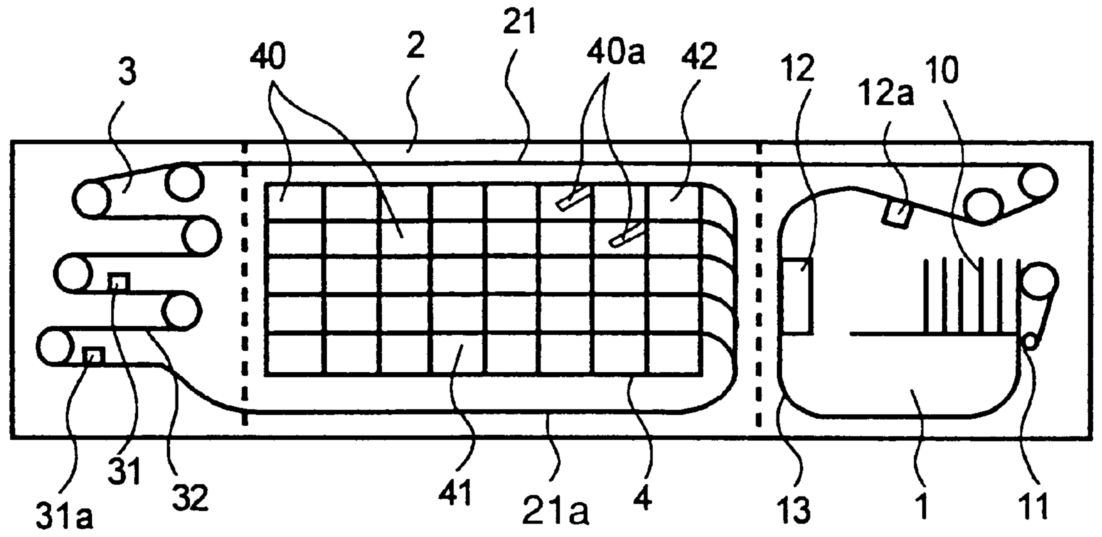
FIG. 11 is a diagram showing a transformation of the apparatus for sorting sheets according to the first embodiment of the present invention.
Figure 12:
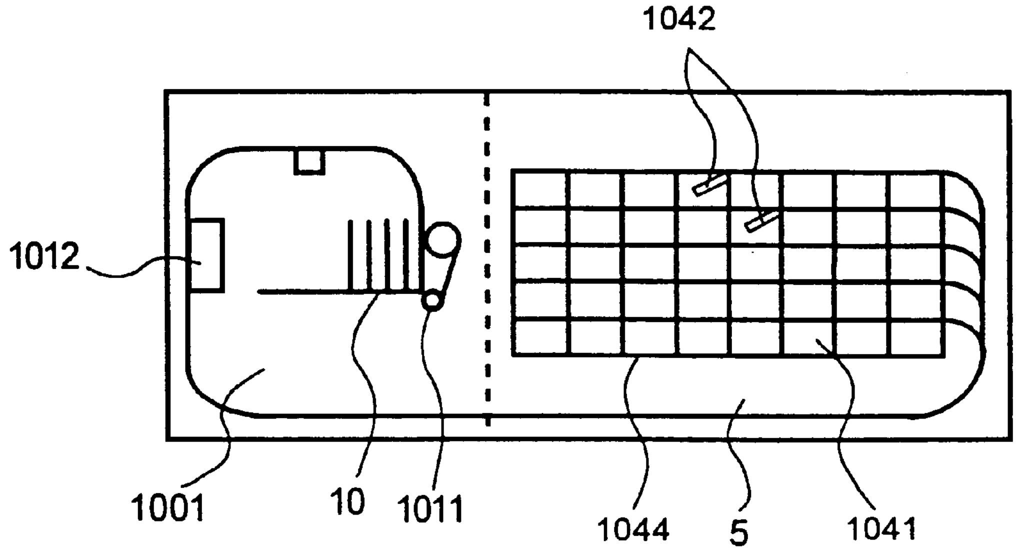
FIG.12 Prior Art
FIG. 12 is a diagram showing a conventional apparatus for sorting sheets.

FIG. 1 is a conceptual view showing a construction of an apparatus for sorting sheets according to a first embodiment of the present invention. FIG. 8 is a side view showing a part cut out of the separating section 1 shown in FIG. 1. FIG. 11 is a conceptual view showing a modification of the apparatus shown in FIG. 1.

The apparatus for sorting sheets includes a sorting section 4 having locating plural boxes 40 arranged in a matrix manner, a separating section 1 located on the left hand side of the sorting section 4 (as viewed from the front of this Figure), and a printing section 3 located on the right hand side of the sorting section 4.

The separating section 1 is constructed to have a separating mechanism 11 for feeding the sheets 10 one by one, a recognizing mechanism 12 for scanning character information such as an address and a zip code described on each of the sheets 10 and a conveying path 13 for sequentially passing a bar code scanning unit 12*a* for scanning the bar code information and the like. The bar code scanning unit 12*a* serves to scan the bar code information printed on the sheet 10 in place of the character information (which will be discussed below).

On the other hand, the printing section 3 includes a printing mechanism 31 for converting the recognized result of each sheet 10 given by the recognizing mechanism 12 which is a recognition computer (not shown) into the bar code information and printing the bar code information on part of each sheet 10, a verifying mechanism 31*a* for scanning the bar code information printed by the printing mechanism 31 and checking if the bar code is precisely printed, and a conveying path 32 for the printing section for feeding the sheet 10 with the bar code printed thereon to the sorting section 4.

The connecting section of the conveying path 32 with the sorting section 4 is branched into the conveying paths (not shown). Those branched paths correspond to the rows of the boxes 40 (from the uppermost box 42 to the lowermost one 41) arranged in a matrix manner, respectively. The connecting section is constructed to distribute the sheets 10 into each box row according to the recognized result given by the foregoing recognizing mechanism 12 or the bar code scanning unit 12*a*.

Each box 40 of the sorting section 4 is provided with a gate 40*a* on the conveying path (not shown) located in the upper part of the sorting section 4. The gate 40*a* is allowed to be individually opened or shut. In operation, the gate 40*a* is opened on the timing when the corresponding sheet 10 is passed according to the recognized result given by the recognizing mechanism 12 and the bar code scanning unit 12*a* located in the separating section 1. With the opening of the gate 40*a,* the specific sheet 10 is taken to the sorting section 4 according to the character information or the bar code information described on the sheet 10. If unrecognized sheets 10 (containing the sheets that are not recognized until they reach the sorting section 4) are stored in the leftmost box 40 that is the nearest to the separating section 1 or a given box 40.

In this embodiment, as shown in FIG. 8, the separating mechanism 11 includes a feeding platform 11*a* on which the sheets 10 are placed in a standing manner so as to justify their lower ends, a pusher 11*b* for horizontally pressing the sheets from one end to the other one of the platform 11*a,* a feeding roller 11*c* for substantially vertically and downwardly feeding the sheets 10 being pressed out to the other end, sensors lid for sensing the tail ends of the sheets coming from the feeding roller 11*c* located in the upper part, and a selector lie for selecting any one of the outputs of the sensors lid and sending out the output to a control system for controlling the operation timing of the feeding roller 11*c.*

When the sensor lid senses the tail end of the leading sheet 10, the operation is executed for continuously feeding out sheets 10 in the constant gap system by operating the feeding roller 11*c* for feeding out the succeeding sheet 10. By properly selecting the outputs of the sensors lid apart from the feeding roller 11*c* (the height of the plane of the platform 11*a*) by their corresponding lengths, it is possible to optionally adjust a gap value. That is, by selecting the sensor that is the furthest from the feeding platform 11*a,* for example, the lowest sensor lid of the shown three sensors, the gap between the leading sheet and the succeeding one is made larger.

As described above, the separating mechanism 11 makes it possible to easily implement the conveying method of the constant gap system by feeding out the sheets 10 downwardly without being adversely effected by the variety of the lengths of the sheets. This is because the apparatus for sorting the sheets according to the present invention treats the sheets with respective lengths.

Next, the delaying conveying path 21 is located in the upper space of the uppermost box 42 contained in the sorting section 4 shown in FIG. 1. The sheets 10, which are conveyed by the conveying path 13 of the separating section 1 in the constant gap system, pass on the delaying conveying path 21 and lead to the conveying path of the printing section 3. The time required for the passage compensates for a time required for character recognition done by the recognizing mechanism (recognition computer) located in the separating section 1 or bar code recognition done by the bar code scanning unit 12*a.*

By downwardly feeding out the sheets 10 in the separating mechanism 11, the conveying path 13 of the separating mechanism is circulated clockwise as viewed from the front of FIG. 1, concretely, in the sequence of the recognizing mechanism 12 and the bar code scanning unit 12*a* and then is smoothly connected to the delaying conveying path 21 in the upper part of the separating section 1. Hence, it is preferable that the delaying conveying path 21 is located on the upper part of the sorting section 4.

Further, by connecting the delaying conveying path 21 located in the upper part of the sorting section 4 to the conveying path 32 of the printing section, the conveyance of the sheets 10 in the printing section 3 is made smoother.

Hereinafter, the description will be oriented to the foregoing overall construction shown in FIG. 1.

The sheets 10 are separated downwardly one by one through the effect of the separating mechanism 11 in the constant gap system, so that each sheet is smoothly passed to the conveying path 32 of the printing section. The separated sheet 10 passes through the recognizing mechanism 12 and then the delaying conveying path 21 that is provided in the upper space of the uppermost box 42 of the sorting section 4. Finally, the sheet is conveyed to the printing mechanism 31 of the printing section 3.

In the meantime, the operation is executed to recognize the characters described on the sheet 10 based on the picture data scanned by the recognizing mechanism 12 for recognizing the characters of the sheet 10, convert the recognized characters into the corresponding bar code, and print the bar code on the sheet 10 through the effect of the printing mechanism 31.

Then, the verifying mechanism 31*a* operates to check if the bar code is precisely printed by the scanning operation immediately after printing. Then, the sheet 10 on which the bar code is printed is conveyed to the sorting section 4 by the conveying path 32 of the printing section. The sorting section 4 operates to group the sheets to each horizontal row and then more definitely to each box 40 on a row according to the recognized result given by the recognizing mechanism 12.

In turn, the description will be oriented to the way of use of the bar code to be described on the sheet 10.

It is considered that the postal collection and delivery is concerned with the operation of treating the postal matters sent by persons and the operation of treating the postal matters collected in another post office and sent therefrom. If each post office provides the apparatus for sorting the sheets according to this embodiment, since the sheets 10 coming from another post office already contain the bar codes described thereon by the printing mechanism 31 as described with respect to FIG. 1, the subject post office does not need to operate the recognizing mechanism 12 for the character recognition because the recognition has been already finished. Hence, the subject post office just needs to scan the bar code through the effect of the bar code scanning unit 12*a* when the post office collects and delivers the postal matters. That is, the subject post office does not need to have the step of recognizing the characters through the recognizing mechanism 12 and is enabled to recognize the data of each sheet 10 only through the bar code scanning unit 12*a.* This is thus effective in reducing the processing time, that is, the sorting time because the complicated character recognition is not necessary to the subject post office.

In order to avoid the double character recognition, the apparatus for sorting the sheets may provide a mode switching function (not shown) for switching the operation from the recognizing mechanism 12 to the bar code scanning unit 12*a* or vice versa.

In place, the recognizing mechanism may provide a function of determining whether or not the bar code is printed. If the bar code has been printed on the sheet 10, the sheet 10 passes by the recognizing mechanism 12. Then, the bar code scanning unit 12*a* is automatically started. According to the scan result of the bar code scanning unit 12*a,* each box 40 located in the sorting section 4 at a later stage may be controlled. For this purpose, the printing and the verifying functions of the printing section 3 are suppressed. As mentioned above, the bar code scan is far faster and more precise than the normal character recognition, which leads to implementing a faster sorting process.

The construction shown in FIG. 1 is divided into the bar code scanning unit 12*a* and the recognizing mechanism 12. In place of the bar code scanning unit 12*a,* the recognizing mechanism 12 may have a function of scanning a bar code. In addition, each section such as the separating section 1 or the printing mechanism 31 is controlled by a control unit (not shown).

As set forth above, the apparatus for sorting the sheets according to this embodiment of the invention is constructed to feed out the sheets 10 downwardly through the effect of the separating mechanism 11. This construction makes it possible to do the conveying operation in the constant gap system with a simple mechanism independently of the dimensional variety of the sheets and achieve a high throughput that is an advantage of the constant gap system.

Location of the delaying conveying path 21 in the upper portion of the sorting section 4 makes it possible to obtain the length of the delaying conveying path 21 and thereby extend the recognition time of the recognizing mechanism 12 without making the overall apparatus bulky. This construction is effective in enhancing the accuracy of the recognized result and eliminating the troublesome works such as a person's manual intervention in the process. Further, the printing section 3 is operated to convert the recognized result of the recognizing mechanism 12 into the corresponding bar code and put it on each sheet 10. This operation makes the fringe works such as collection and delivery more efficient.

The locational relation of the separating section 1 and the printing section 3 with respect to the sorting section 4 may be changed into the location shown in FIG. 11 in which the separating section 1 is replaced with the printing section 3 in location. In this construction, a delaying conveying path 21*a* may be located in a lower space 5 of the sorting section 4 for connecting the printing section 3 to the sorting section 4 in addition to the delaying conveying path 21 passing through the upper space 2 of the sorting section 4.

The separating section 1 operates to downwardly separate the sheets 10 in the constant gap system as described with respect to FIG. 1. The sheets are circulated clockwise as viewed from the front. Further, the delaying conveying paths are provided in the upper and the lower portions of the sorting section 4 so that the separating section 1, the printing section 3, and the sorting section 4 are smoothly connected by the conveying paths. The construction shown in FIG. 11 makes it possible to increase the length of the delaying conveying path 21 and thereby extend the recognizing time consumed by the recognizing mechanism 12 more than the construction shown in FIG. 1 without making the overall apparatus bulky. This construction is effective in enhancing the accuracy of the recognized result more.

Embodiment 2

In turn, the description will be oriented to the method for displaying the character information cut by the recognizing mechanism 12 on a CRT and entering the unrecognized portion with a person's hands (called a video coding method). This method is used if some of the scanned characters are not recognized or a long time is consumed in recognizing the characters.

Figure 2:
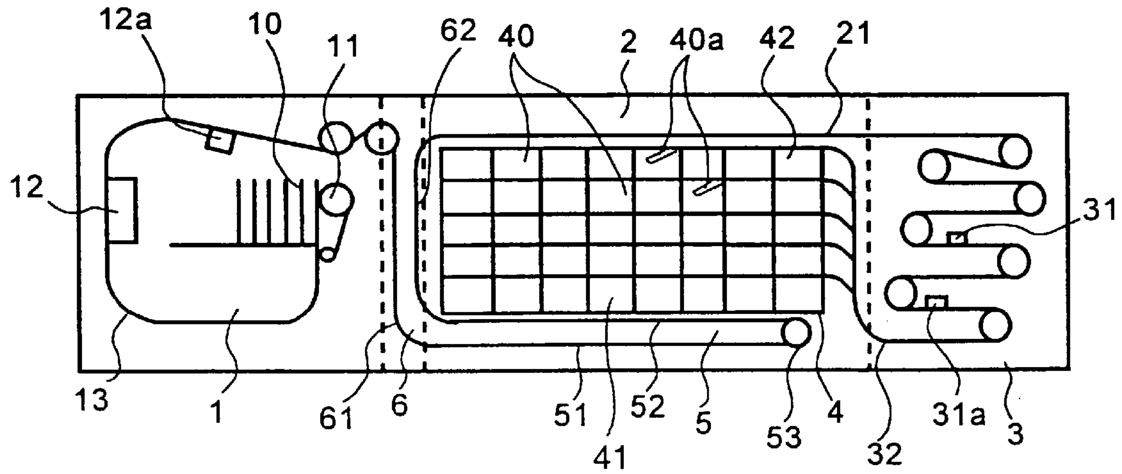
FIG. 2 is a view showing a construction of an apparatus for sorting sheets according to a second embodiment of the present invention.
Figure 9:
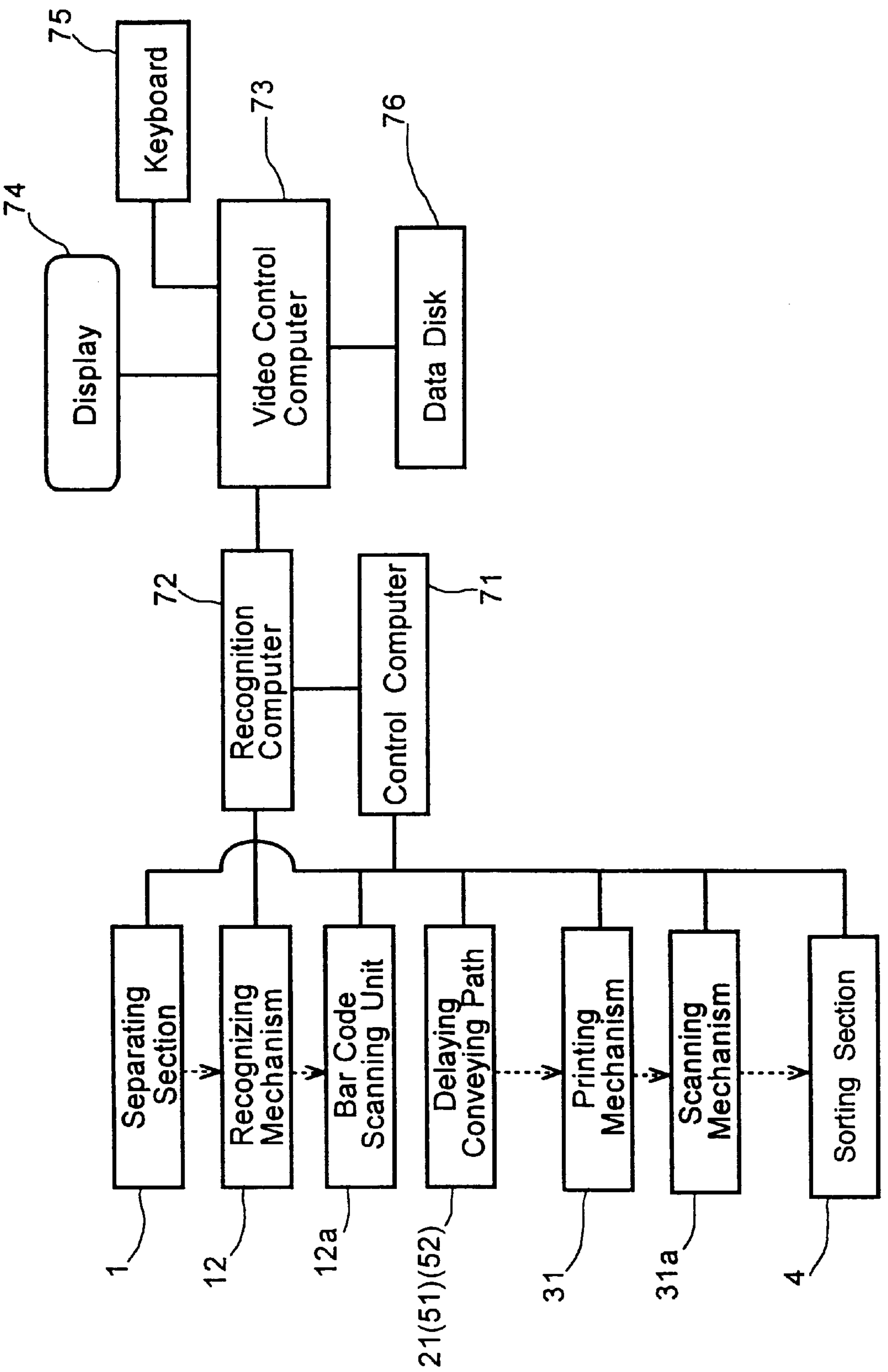
FIG. 9 is a block diagram showing an arrangement of a control system located in an apparatus for sorting sheets according to the present invention.
Figure 10A:
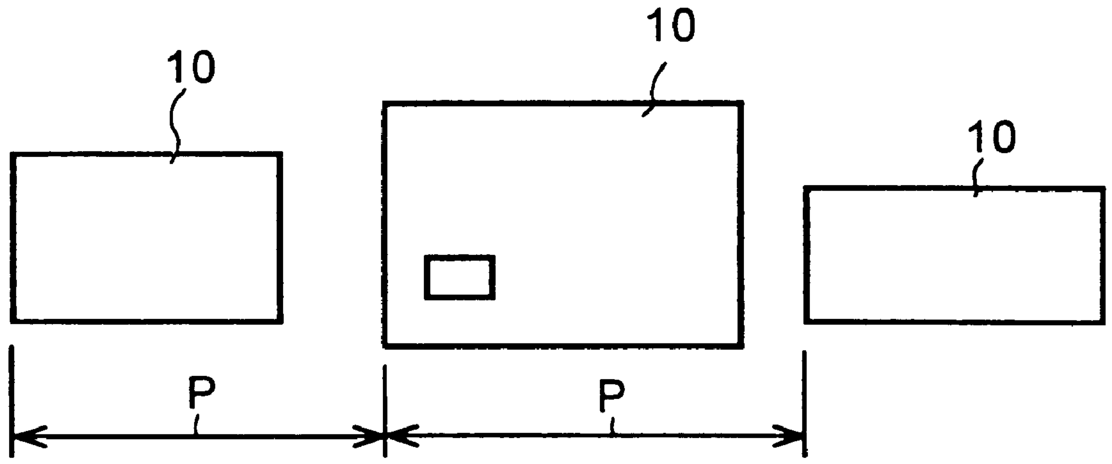
FIGS. 10A and 10B are explanatory views showing a separating system adopted to the apparatus for sorting sheets.
Figure 10B:
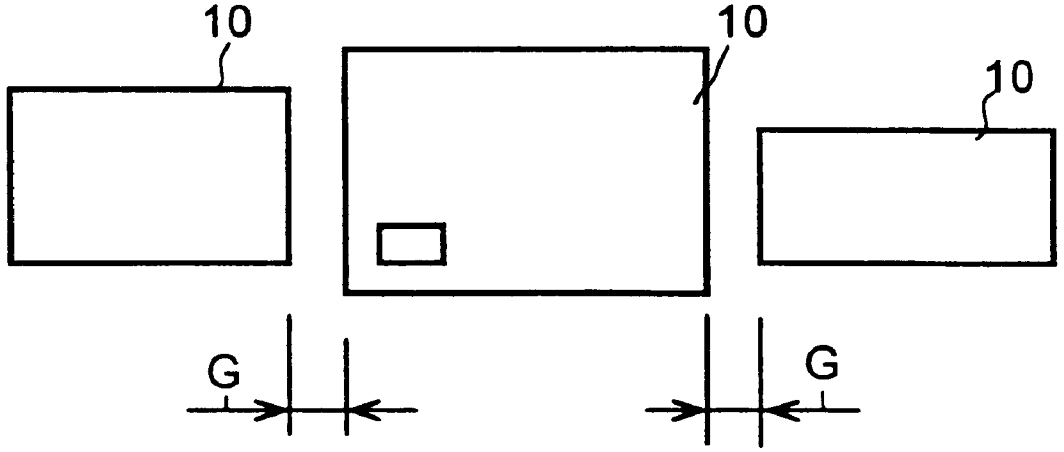

FIG. 2 is a construction plan showing a construction of an apparatus for sorting sheets according to the second embodiment of the present invention. FIG. 9 is a block diagram showing an arrangement of a control system.

The control system included in this apparatus will be described with reference to FIG. 9.

A control computer (or simply called a control unit) 71 controls the overall operation of all sections including the separating section 1 to the sorting sections. The recognizing mechanism 12 is connected to a recognition computer 72 dedicated to recognition. The recognition computer 72 is operated in concert with the control computer 71 for the purpose of transferring the recognized result, for example. The recognition computer 72 is also connected to a video control computer 73 for supporting the video coding, a display 74 for indicating the data such as a picture to an operator, a keyboard 75 on which code data or something is entered, a data disk 76 for saving the unrecognized picture data, and so forth.

FIG. 9 illustrates the control computer 71, the recognition computer 72, and the video control computer 73 for explanation's sake. Those computers may be implemented by an inexpensive computer having a large processing capability.

The operation of manually entering the characters that are not recognized by the recognition computer 72 needs a longer time than the time consumed by the character recognition discussed in detail in connection with embodiment 1. In this embodiment 2, a bypass is added to the construction of the foregoing embodiment 1, The bypass is provided in the lower space 5 of the lowermost box 41 located in the sorting section 4 in order that the bypass consumes a proper time for this purpose.

Concretely, the conveying path 13 of the separating section 1 is connected to the conveying path 61 of the connecting section 6 coming downwardly so that the sheets are conveyed to the bypass conveying path 51 passing through the lower space 5 of the sorting section. The bypass conveying path 51 goes around in the bypass portion 53 and then the bypass conveying path 52 is connected with the conveying path 62 of the connecting section 6 coming upwardly. Then, the conveying path 62 is connected with the delaying conveying path 21 located in the upper space 2 of the sorting section 4 so that the sheets 10 are conveyed from the sorting section 4 to the printing section 3. While the sheets are passed through the bypass conveying paths 51 and 52 and the delaying conveying path 21, the person's input data is converted into the corresponding bar code and the bar code is printed on the corresponding sheet 10 by the printing mechanism 31.

If the person's manual input consumes less time, the bypass conveying paths 51 and 52 may be set to have a shorter length. As is illustrated in FIG. 3, as compared with the construction shown in FIG. 2, the bypass 53 is located in the left hand as viewed from the front of the drawing, so that the horizontal distance between the separating section 1 and the bypass 53 is made shorter.

If the sorting section 4 has more boxes 40, the delaying conveying path 21 located in the upper part of the sorting section 4 is made longer. In this case, the delaying conveying path located in the bypass (the bypass conveying paths are generically called a delaying conveying path.) may be made shorter because the overall length of the delaying conveying path for recognizing the characters is the same as the length of the above case.

Figure 3:
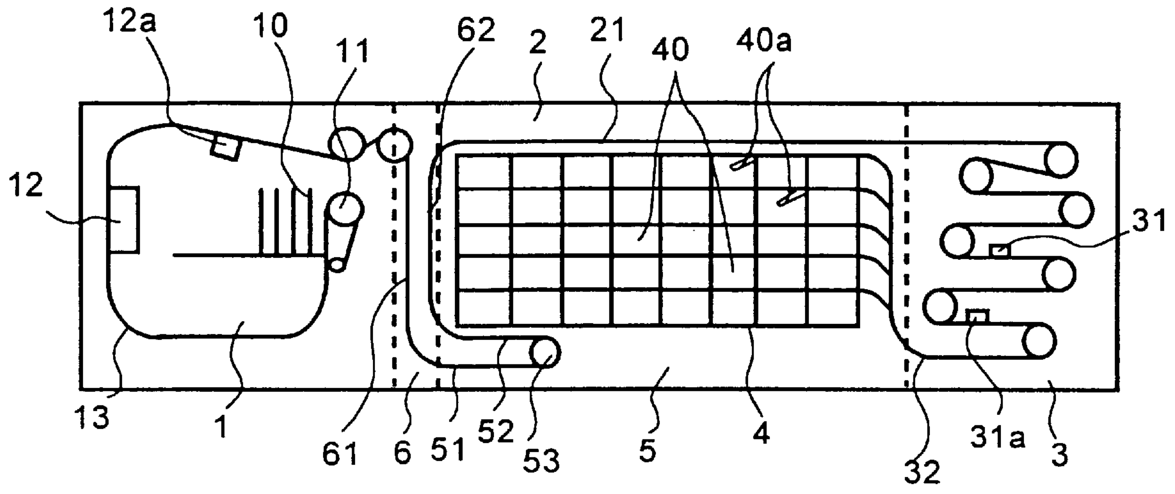
FIG. 3 is a view showing a transformation of the construction of an apparatus for sorting sheets according to the second embodiment of the present invention.

Since the sorting section 4 shown in FIG. 3 does not have so many boxes 40, as shown, the lower space 5 is wide enough to secure the considerably long bypass conveying path.

However, the sorting section 4 is required to make the boxes 40 as numerous as possible and the box rows are preferably increased in number. Thus, the lower space 5 is made narrower, so that it is better to put the conveying path 32 of the printing section to the boxes 40 from the lower portion in light of the connectivity of the conveying paths from the printing section 3 to the sorting section 4.

Hence, the conveying path 32 of the printing section is provided under the apparatus with no substantial gap therebetween. As shown in FIG. 3, the vertical direction of the bypass portion 53 of the bypasses 51 and 52 is optionally set in order not to be overlapped with the conveying path 32 led from the printing section 3 to the sorting section 4. As a result, since the conveying path 32 of the printing section is allowed to be guided from a far lower portion to the sorting section 4, it is possible to keep a wide space of the sorting section 4 and increase the box rows in number as keeping the connectivity between the conveying paths.

Embodiment 3

Figure 4:
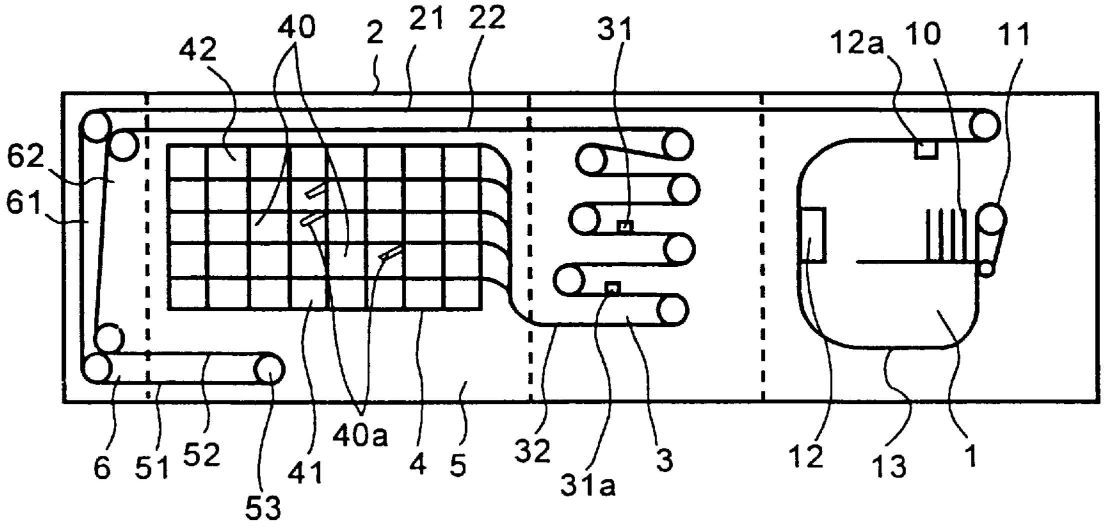
FIG. 4 is a view showing a construction of an apparatus for sorting sheets according to a third embodiment of the present invention.

FIG. 4 is a conceptual view showing a construction of an apparatus for sorting sheets according to a third embodiment of the present invention. This apparatus provides the conveying path changed according to the relocation of the separating section.

That is, the apparatus according to the third embodiment of the invention is arranged to have the printing section 3 and the separating section 1 collectively located to the right of the sorting section 4 (as viewed from the front of the drawing).

Hence, the apparatus is divided into the sorting section 4 with which the operator often manually engages for taking out the postcards, for example, and the other sections (separating section 1 and printing section 3) that need no substantial manual operation. This construction makes it easier to maintain this apparatus.

The conveying path 13 of the separating section 1 may be connected to the delaying conveying path 21 as described with respect to FIG. 1 only if the delaying conveying path 21 is extended by the width of the printing section 3. It means that the construction of the separating section 1 does not need any large change. Likewise, the inlet of the conveying path 32 of the printing section 3 is just connected to the delaying conveying path 22 located in the sorting section 4 in parallel to the delaying conveying path 21. No large change is required for the construction of the printing section 3. That is, the separating section 1 may be located selectively to the left of the sorting section 4 as shown in FIGS. 1 and 2 or to the right of the sorting section 4 as shown in FIG. 4.

In the construction shown in FIG. 4, the overall delaying conveying path is made longer by the length of the delaying conveying path 22, so that the length of the bypass 53 (bypass conveying paths 51 and 52) located in the lower portion of the sorting section 4 may be shorter accordingly. It means that the bypass portion 53 located in the lower space 5 may be relocated in order not to interfere with the conveying path 32 of the printing section 3. Hence, the bypass is not overlapped with the conveying path 23 of the printing section 3. The conveyance of the sheets 10 is likewise the same as that described with respect to FIG. 2.

Embodiment 4

Figure 5:
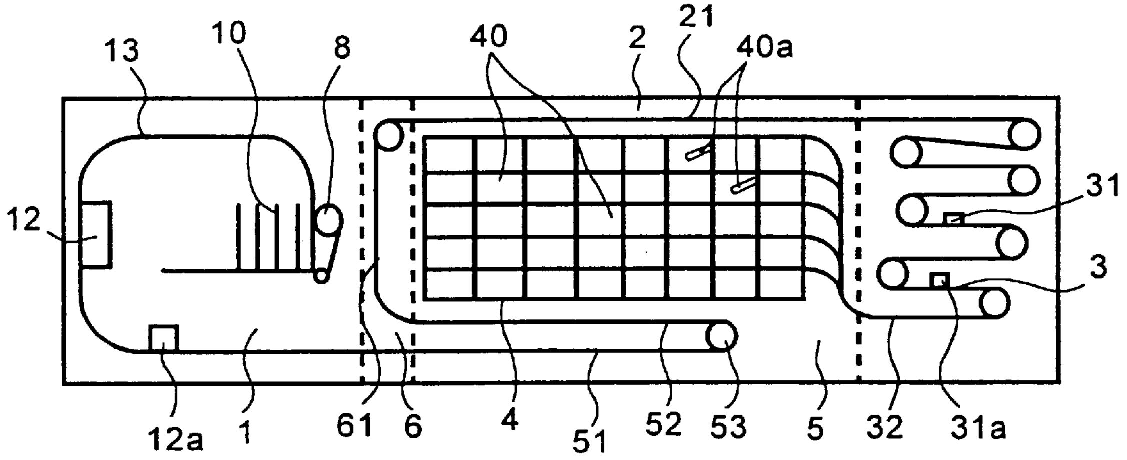
FIG. 5 is a view showing a construction of an apparatus for sorting sheets according to a fourth embodiment of the present invention.

FIG. 5 is a view showing a construction of the apparatus for sorting sheets according to a fourth embodiment of the present invention.

In this embodiment, the separating section 8 operates to separate the sheets upwardly. Each sheet separated by the separating section 8 passes through the recognizing mechanism 12 and the bar code scanning unit 12*a* and then is sent to the bypass conveying path 51 located in the lower space 5 of the sorting section 4. Then, the sheet is bypassed around the bypass portion 53 and is conveyed on the bypass conveying path 52. The bypass conveying path 52 is connected with a conveying path 61 of a connecting section 6. Then, the conveying path 61 is connected with the delaying conveying path 21 located in the upper portion of the sorting section 4 and then is conveyed to the printing section 3. In the printing section 3, the printing mechanism 31 operates to print a bar code on the sheet 10 conveyed thereto. The sheet with the bar code printed thereon is verified by the verifying mechanism 31*a*. The sheet 10 on which the bar code is printed is conveyed to the sorting section 4 through the conveying path 32 of the printing section and then is sorted to the destination box.

The foregoing construction has the following advantage. The conveying path 13 of the separating section is circulated counterclockwise, so that the conveying path 13 may be smoothly and unbendably connected to the bypass conveying path 51 located in the lower portion of the sorting section 4.

Embodiment 5

Figure 6:
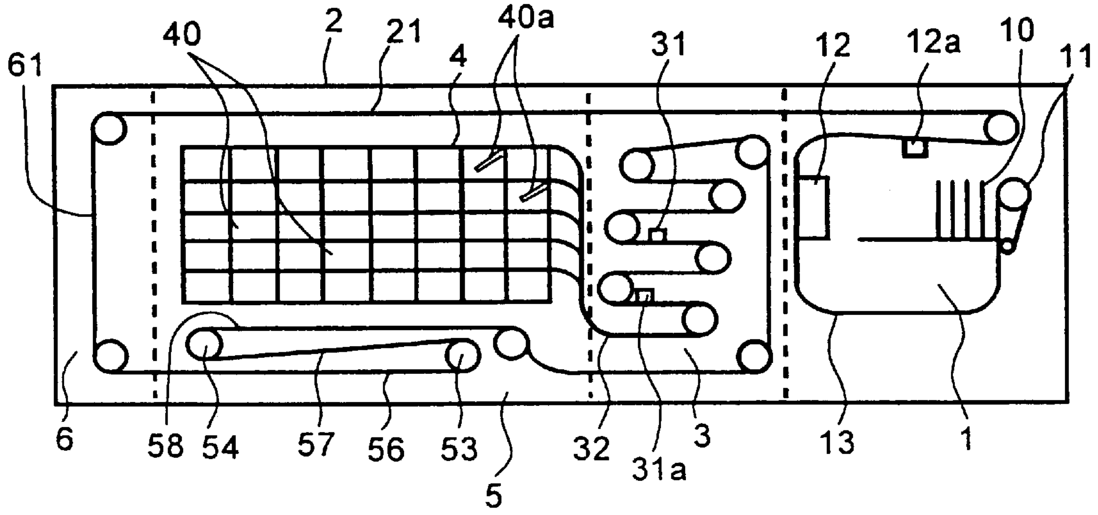
FIG. 6 is a view showing a construction of an apparatus for sorting sheets according to a fifth embodiment of the present invention.
Figure 7:
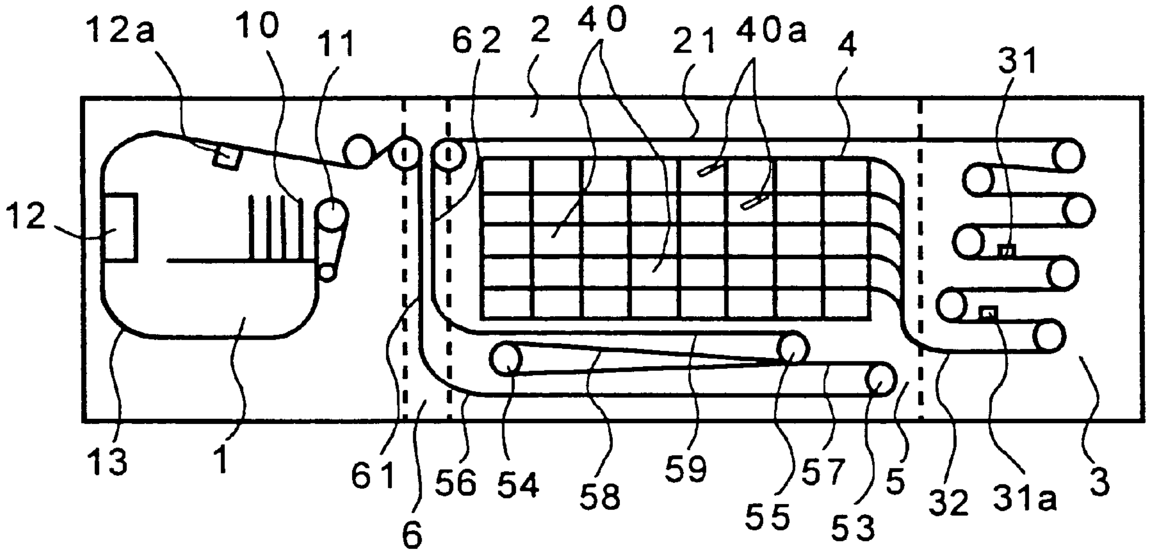
FIG. 7 is a view showing another construction of the apparatus for sorting sheets according to the fifth embodiment of the present invention.

FIGS. 6 and 7 show the construction of the apparatus for sorting the sheets according to a fifth embodiment of the present invention. In particular, FIG. 6 shows the construction of the sorting section and the other sections. FIG. 7 shows the construction having the sorting section described with respect to FIG. 1 located in the center of the figure.

In the fifth embodiment, three bypass portions 53, 54, and 55 are located in the lower space 5 of the sorting section 4 so that the corresponding bypass conveying paths 56, 57, 58, and 59 are located in the lower space 5.

That is, in FIG. 6, the printing section 3 and the separating section 1 are collectively located to the right of the sorting section 4. The sheets 10 processed by the recognizing mechanism 12 and the bar code scanning unit 12*a* located in the separating section 1 pass through the delaying conveying path 21 located in the upper portion of the sorting section 4 and the conveying path 61 of the connecting section 6 and then reach the lower portion of the sorting section 4. Then, the sheets are passed through the bypass conveying path 56, the bypass portion 53, the bypass conveying path 57, the bypass portion 54 and the bypass conveying path 58 located in the lower portion of the sorting section 4 and are conveyed to the lower portion of the printing section 3. Finally, the sheets are passed to the conveying path 32 of the printing section 3.

Turning to FIG. 7, the separating section 1 is located opposite to the printing section 3 with the sorting section 4 located between the sections 1 and 3. The bypass portions 53, 54, and 55 and the bypass conveying paths 56 to 59 are located in the lower space 5 of the sorting section 4.

In FIG. 7, the sheets 10 recognized by the separated section 1 come downwardly through the conveying path 61 of the connection portion 6, thereby leading to the lower portion of the sorting section 4. Then, the sheets 10 are passed through the bypass conveying path 56, the bypass portion 53, the bypass conveying path 57, the bypass portion 54, the bypass conveying path 58, the bypass portion 55, and the bypass conveying path 59 and then go up on the conveying path 62 of the connecting section 6. Then, the sheets 10 reach the delaying conveying path 21 located in the upper portion of the sorting section 5 and then are sent to the printing section 3.

As described above, in the construction of FIG. 6, two turnover points, that is, the bypass portions 53 and 54 are provided so that the three bypass conveying paths 56, 57, and 58 are located in a manner to pass through the lower portion of the sorting section 4.

In the construction of FIG. 7, three turnover points, that is, the bypass portions 53 to 55 are provided so that the four bypass conveying paths 56 to 59 are located in the lower portion of the sorting section 4. The paths enter from the connecting section 6 to the left of the sorting section 4 and then return to the connecting section 6. In either case, the bypass conveying paths 56 to 59 may secure a sufficient delaying time for the recognition done by the recognizing mechanism 12, which leads to obtaining a highly accurate recognized result. Further, this delaying conveying path utilizes the upper and the lower spaces of the sorting section 4, so that the overall apparatus is not made larger in size, in particular, in length. In the construction of FIG. 6, two or more even turnover points may be provided for extending the conveying path. In the construction of FIG. 7, three or more odd turnover points may be provided for doing so.

As set forth above, according to the foregoing embodiments of the invention, the use of the upper and the lower spaces of the sorting section 4 for locating the delaying conveying path makes it possible to implement a substantially straight delaying conveying path with no substantial bending portion, which results in reducing impairment from which the sheets 10 suffer. Further, the use of the upper and the lower spaces for the delaying conveying path also makes it possible to secure a required time for recognizing the characters without making the overall apparatus longer, thereby improving the recognizing accuracy.

The delaying conveying path and the bypass conveying path located in the lower portion of the sorting section 4 may be provided so that those paths are not overlapped with (do not interfere with) the conveying path of the printing section for introducing the sheets 10 from the printing section 3 to the sorting section 4. Hence, the boxes 40 of the sorting section 4 may be spaciously provided in the vertical direction.

The foregoing description has been concerned with various embodiments of the present invention. However, the present invention is not limited to those embodiments and may be transformed without departing from the spirit of the invention.

The apparatus for sorting the sheets according to the present invention offers an advantage that the length of the delaying conveying path is increased without increasing the dimensions of the apparatus.

The apparatus offers another advantage that the length of the delaying conveying path is increased without impairing the sheets.

Further, the apparatus offers an advantage that the delaying conveying path may be long enough to compensate for a video coding time without having to increase the dimensions of the apparatus.

Moreover, the apparatus offers an advantage that the constant gap system of this apparatus used for conveying the sheets makes it possible to keep or enhance the throughput without any relation with a dimensional variety of sheets.

We claim:

1. An apparatus for sorting sheets comprising:

a separating section for separating said sheets one by one;

a recognizing unit for scanning a text image printed on each separated sheet;

a computer for recognizing said scanned text image;

a delaying conveying path for extending conveyance of said sheets by a time required for the recognition done by said computer;

a printing section for converting said recognized result into bar code information and printing said bar code information on said sheets;

a sorting section for sorting said sheets with said bar code information printed thereon into boxes arrange in a matrix manner; and wherein said delaying conveying path includes two delaying conveying paths located in upper and lower portions of the boxes of said sorting section and a connecting conveying path connected with said upper and lower delaying conveying paths and at least one of said two delay conveying paths contains a bypass conveying path located in a manner to reciprocate in the width direction of said sorting section.

2. An apparatus for sorting sheets as claimed in claim 1, wherein a turnover point of said bypass conveying path may be set to an optional point.

3. An apparatus for sorting sheets as claimed in claim 2, wherein two or more of said turnover points are provided for said bypass conveying path.

4. An apparatus for sorting sheets comprising:

a separating section for separating said sheets one by one;

a recognizing unit for scanning a text image printed on each separated sheet;

a computer for recognizing said scanned text image;

a delaying conveying path for extending conveyance of said sheets by a time required for the recognition done by said computer;

a printing section for converting said recognized result into bar code information and printing said bar code information on said sheets;

a sorting section for sorting said sheets with said bar code information printed thereon into boxes arranged in a matrix manner; and wherein said delaying conveying path is located in a lower portion of the boxes of said sorting section and contains a bypass conveying path that is bypassed to be off an inlet conveying path led from said printing section to said sorting section.

5. An apparatus for sorting sheets as claimed in claim 4, wherein a turnover point of said bypass conveying path may be set to an optional point.

6. An apparatus for sorting sheets as claimed in claim 5, wherein two or more of said turnover points are provided for said bypass conveying path.

7. An apparatus for sorting sheets comprising:

a separating section for separating the sheets one by one;

a recognizing unit for scanning a text picture printed on each separated sheet;

a computer for recognizing said scanned text picture;

a delaying conveying path for extending the conveyance of said sheets by a time required for the recognition done by said computer;

a printing section for converting said recognized result into bar code information and printing said bar code information on said sheets;

a sorting section for sorting said sheets with said bar code information printed thereon into boxes arranged in a matrix manner; and wherein said delaying conveying path contains a bypass conveying path located in a lower portion of said boxes and a turnover point of said bypass conveying path is located in a manner not to interfere with an inlet conveying path led from said printing section to said sorting section.

8. An apparatus for sorting sheets as claimed in claim 7, wherein two or more of said turnover points are provided for said bypass conveying path.

9. An apparatus for sorting sheets as claimed in claim 7, further comprising a bar code scanning unit for scanning the bar code information printed on the sheets, and wherein when the sheets with said bar code information printed thereon are separated by said separating section and then conveyed, said bar code scanning unit scans the bar code printed on the sheets and said computer operates to control said sheets to be sorted into a predetermined one of said boxes according to the scanned result.

10. An apparatus for sorting sheets as claimed in claim 9, wherein said delaying conveying oath delays the conveyance of said sheets by a scanning time required by said bar code scanning unit.

11. An apparatus for sorting sheets as claimed in claim 10, wherein said delaying conveying path is located in an upper portion, a lower portion, or both of the upper and lower portions of the boxes of said sorting section.

12. An apparatus for sorting sheets comprising:

a separating section for separating the sheets one by one;

a recognizing unit for scanning a text picture described on each separated sheet;

a control unit for sorting the sheets on the recognized result of said text picture scanned by said recognizing unit;

a printing section for replacing the recognized result given by said control unit with bar code information and printing said bar code information on said sheets;

a sorting section for sorting the sheets with said bar code information printed thereon in a manner to group said sheets into corresponding boxes;

a verifying unit for determining if said bar code information is printed on said sheet by said printing section; and wherein the apparatus has a function of selecting any one of a first construction wherein a first unit containing said separating section and said recognizing unit is located opposite to a second unit containing said printing section with said sorting section laid therebetween and a second construction wherein said first and second units are located in contact with one side of said sorting section.

13. An apparatus for sorting sheets comprising:

a separating section for separating said sheets one by one;

a recognizing unit for reading a text picture printed on each separated sheet;

a control unit for sorting said sheets on the recognized result of the text picture read by said recognizing unit;

a printing section for replacing the recognized result given by said control unit with bar code information and printing said bar code information on the corresponding separated sheet;

a sorting section for sorting said sheet in a manner to group said sheets with said bar code information printed thereon into corresponding boxes; and a delaying conveying path for extending the conveyance of said sheets to take a time more or equal to recognizing time given by said control unit; and wherein said delaying conveying path is arranged on an upper side of said sorting section to connect a first unit including said separating section with a second unit including said printing sections, said sorting section being positioned between said first and second units.

14. An apparatus according to claim 13, further comprising a verifying reading section arranged on a downstream portion of said printing section for checking if the bar code information is printed on each of said sheets by said printing section.

15. An apparatus according to claim 13, wherein said separating section separates said sheets one by one and sends said sheets downwardly with a substantially constant gap therebetween.

16. An apparatus for sorting sheets comprising:

a first unit including a separating section for separating said sheets one by one and a recognizing unit for reading a text picture printed on each separated sheet;

a second unit including a printing section for replacing the recognized result given by said recognizing unit with bar code information and printing said bar code information on a corresponding separated sheet; and a third unit including a plurality of boxes in which said sheets are sorted in a manner to group said sheets with said bar code information printed thereon into corresponding boxes; and wherein said third unit is positioned between said first and second units to separate said first and second units and includes a conveying path of said sheets for connecting said first and second units.

17. An apparatus according to claim 16, wherein said conveying path is arranged on an upper side of said plurality of boxes.

18. An apparatus according to claim 16, wherein said separating section separates said sheets one by one and sends said sheets downwardly with a substantially constant gap therebetween.

* * * * *

UNITED STATES PATENT AND TRADEMARK OFFICE
CERTIFICATE OF CORRECTION

PATENT NO. : 5,959,288
DATED : September 28, 1999
INVENTOR(S) : T. Tajiri, et al.

It is certified that error appears in the above-identified patent and that said Letters Patent is hereby corrected as shown below:

On the title page:

Item [73], delete "EHG Electroholding GmbH, Frankfurt/Main, Germany" and insert therefor --Siemens Aktiengesellschaft, München, Germany--.

Signed and Sealed this

Thirty-first Day of October, 2000

*Attest:*

Q. TODD DICKINSON

*Attesting Officer*

*Director of Patents and Trademarks*